(12) United States Patent
Velazquez et al.

(10) Patent No.: US 10,609,982 B2
(45) Date of Patent: Apr. 7, 2020

(54) SANDAL CONSTRUCTION

(71) Applicant: Wolverine Outdoors, Inc., Rockford, MI (US)

(72) Inventors: Omar Velazquez, Grand Rapids, MI (US); Peter Fogg, Lake Oswego, OR (US); Andrew Estey, Grand Rapids, MI (US); Theo Malkin, Ada, MI (US)

(73) Assignee: Wolverine Outdoors, Inc., Rockford, MI (US)

( * ) Notice: Subject to any disclaimer, the term of this patent is extended or adjusted under 35 U.S.C. 154(b) by 100 days.

(21) Appl. No.: 15/981,113

(22) Filed: May 16, 2018

(65) Prior Publication Data

US 2019/0350304 A1     Nov. 21, 2019

(51) Int. Cl.
| | |
|---|---|
| *A43B 3/12* | (2006.01) |
| *A43B 13/12* | (2006.01) |
| *A43B 5/00* | (2006.01) |
| *A43B 13/18* | (2006.01) |
| *A43B 13/04* | (2006.01) |
| *A43B 13/16* | (2006.01) |
| *A43B 7/14* | (2006.01) |
| *A43B 3/26* | (2006.01) |
| *B32B 7/02* | (2019.01) |
| *B32B 27/08* | (2006.01) |

(Continued)

(52) U.S. Cl.
CPC .............. *A43B 3/128* (2013.01); *A43B 3/122* (2013.01); *A43B 3/126* (2013.01); *A43B 3/26* (2013.01); *A43B 5/00* (2013.01); *A43B 7/14* (2013.01); *A43B 13/04* (2013.01); *A43B 13/127* (2013.01); *A43B 13/16* (2013.01); *A43B 13/186* (2013.01); *B29D 35/0018* (2013.01); *B29D 35/142* (2013.01); *B32B 7/02* (2013.01); *B32B 27/08* (2013.01); *B32B 27/40* (2013.01); *B29K 2075/00* (2013.01); *B32B 2437/02* (2013.01)

(58) Field of Classification Search
CPC ........... A43B 3/12; A43B 3/122; A43B 3/124; A43B 3/126; A43B 3/128
See application file for complete search history.

(56) References Cited

U.S. PATENT DOCUMENTS 2,259,273 A * 10/1941 Smith .................... A43B 3/122
                                              36/11.5
2,468,573 A *  4/1949 Rimer .................... A43B 3/122
                                              36/11.5

(Continued)

*Primary Examiner* — Ted Kavanaugh
(74) *Attorney, Agent, or Firm* — Warner Norcross + Judd LLP (57) ABSTRACT

A sandal construction configured to provide high performance in athletic, sporting and other activities not typically associated with sandals. The sandal includes a sole with an integrated sole plate and an upper with a heel cradle configured to assist in maintaining close contact between the sole and the heel of the wearer's foot during use. The heel cradle may be molded with a three-dimensional shape that is anatomically correct and is inwardly angled to extend into and assist in holding the heel down against the upper surface of the sole. The sole may include a dual-density midsole with a softer upper layer and firmer lower layer. The sole plate may be embedded in the lower layer. The sole plate may include a heel cup defining a central opening. The upper surface of the midsole may include a heel recess aligned with the heel cup and the central opening.

20 Claims, 9 Drawing Sheets

(51) Int. Cl.
  B32B 27/40  (2006.01)
  B29D 35/14  (2010.01)
  B29D 35/00  (2010.01)
  B29K 75/00  (2006.01)

(56) References Cited

U.S. PATENT DOCUMENTS

| | | | | |
|---|---|---|---|---|
| 6,021,585 | A * | 2/2000 | Cole | A43B 3/122 |
| | | | | 36/11.5 |
| 7,121,020 | B1 * | 10/2006 | Bathum | A43B 3/128 |
| | | | | 36/102 |
| 8,640,363 | B2 * | 2/2014 | Hsu | A43B 7/14 |
| | | | | 36/101 |
| 2003/0074806 | A1 * | 4/2003 | Urie | A43B 3/126 |
| | | | | 36/11.5 |
| 2003/0172548 | A1 * | 9/2003 | Fuerst | A43B 13/026 |
| | | | | 36/28 |
| 2008/0244932 | A1 * | 10/2008 | Nau | A43B 3/0036 |
| | | | | 36/102 |
| 2018/0110285 | A1 * | 4/2018 | Cohen | A61F 5/14 |

* cited by examiner

SANDAL CONSTRUCTION

BACKGROUND OF THE INVENTION

The present invention relates to footwear and more particularly to the construction of sandals.

Sandals have long been an important component of footwear. In the early development of footwear, sandals played an important role in virtually all types of activities. However, as closed footwear developed, conventional sandals became less a preferred style of choice of footwear for some applications—particularly for high performance sport and athletic applications. As a result, sandals are not typically associated with high performance sport and athletic activities.

Typical sandal uppers are manufactured from one or more straps that are anchored to the sole and engage with various parts of the wearer's foot. Experience has revealed that because of the general open nature of sandal uppers, it is difficult to provide a sandal construction in which close contact between the wearer's foot and the sole of the sandal is maintained through high intensity activities. Some sandal constructions provide limited improvement in foot retention in the forefoot region, but conventional sandal constructions continue to suffer from a general inability to maintain constant, firm foot/sole contact along the length of the sole throughout the wearer's stride—particularly during intense physical activity.

The problems associated with maintaining foot/sole contact can be exacerbated when the sandal is provided with a relatively stiff sole. As may be evident, anything that interferes with the ability of the sole to flex is concert with the wearer's foot can interfere with efforts to maintain good foot/sole contact. As a result of the shortcomings of conventional sandal uppers, conventional sandal soles are typically relatively flexible and do not include embedded plates, such as energy-return plates, that are common in closed toe running shoes. The result is that conventional sandal constructions generally do not provide the level of energy storage and return often associated with high performance athletic footwear.

SUMMARY OF THE INVENTION

The present invention provides a sandal construction configured to provide high performance in athletic, sporting and other activities not typically associated with sandals. The sandal includes a sole with an integrated sole plate and an upper with a heel cradle configured to assist in maintaining close contact between the sole and the heel of the wearer's foot during use. The heel cradle may be molded with a three-dimensional shape that is anatomically correct and is inwardly angled to extend into and assist in holding the heel down against the upper surface of the sole.

In one embodiment, the heel cradle is injection molded with a three-dimensional shape that includes a pair of generally vertical posts that are secured to the sole and extend upwardly along opposite sides of the heel and a horizontal strap that wraps around the rear of wearer's foot. The vertical posts and horizontal strap may be integral parts of a one-piece molded component. In one embodiment, the vertical posts extend inwardly at an angle of approximately 64 degrees from vertical so that the heel cradle extends into the narrow space above the calcaneus or heel bone, which allows the heel cradle to comfortably seat and retain the heel of the wearer's foot. The horizontal strap may include a rear portion that is configured to engage the rear of the wearer's foot above the calcaneus.

In one embodiment, the sole includes a lower midsole portion manufactured from a first cushioning material of the desired stiffness and an upper midsole portion manufactured from a second cushioning material that is substantially softer than the first cushioning material. The upper and lower sole portions may be molded together into a one-piece dual-density sole component. The upper sole portion may have a hardness of about 48+/−4 Shore C and the lower sole portion may have a hardness of about 68+/−4 Shore C.

In one embodiment, the top of the sole may have a three dimensional shape intended to follow the anatomical shape of a typical wearer's foot. For example, the upper surface of the sole may be configured to mirror the shape of the undersurface of a typical wearer's foot. The sole may include a heel recess, a central arch support and a generally planar forefoot region. The heel recess may be position to help seat the heel of the wearer's foot when the wearer's foot is properly engaged with the three-dimensional heel strap.

In one embodiment, the plate is embedded within the sole, for example, using an insert molding process. The plate may be embedded within the second cushioning material. In one embodiment, the plate is embedded within the second cushioning material adjacent to and parallel with the upper extent of the second cushioning material. To provide the desired interaction between the sandal upper and the sole, the plate may be manufactured from a material having a hardness of about 73+/−2 Shore D. This hardness will provide significant energy return without preventing good foot/sole contact.

In one embodiment, the plate defines a large opening in the center of the heel region. The heel opening allows the heel of the wearer's foot to more easily sink into the heel. In one embodiment, the heel region of the plate includes a three-dimensional heel cup with an open central portion configured to help center and hold the heel of the wearer's foot. The heel cup may be provided with a convex heel structure surrounding the heel opening.

In one embodiment, the plate defines a plurality of openings configured to accommodate the sandal straps, and to assist in providing the plate with controlled flexibility. The number, size, shape and location of the openings may be varied from application to application to provide customized plate characteristics.

The present invention provides a simple and effective sandal construction that is capable of providing improved support for athletic, sport and other performance applications. The sole plate provides the sole with improved energy return as compared to conventional sandal sole, while the enhanced heel cradle helps to maintain proper contact between the sole and the wearer's foot despite the presence of the plate. The use of a dual density midsole allows a softer material to be positioned directly under the foot to improve comfort and a firmer material to be positioned beneath the softer material to provide the desired level of support. It also permits the sole plate to be embedded in the firmer material, where it provides improved support and energy return that is closer to the wearer's foot. The three-dimensional shape of the sole plate helps to center the heel of the wearer's foot. The three-dimensional shape of the sole plate may be selected to correspond with the shape of the heel cradle such that the two cooperate in helping to position and retain the wearer's foot.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

Figure 1:
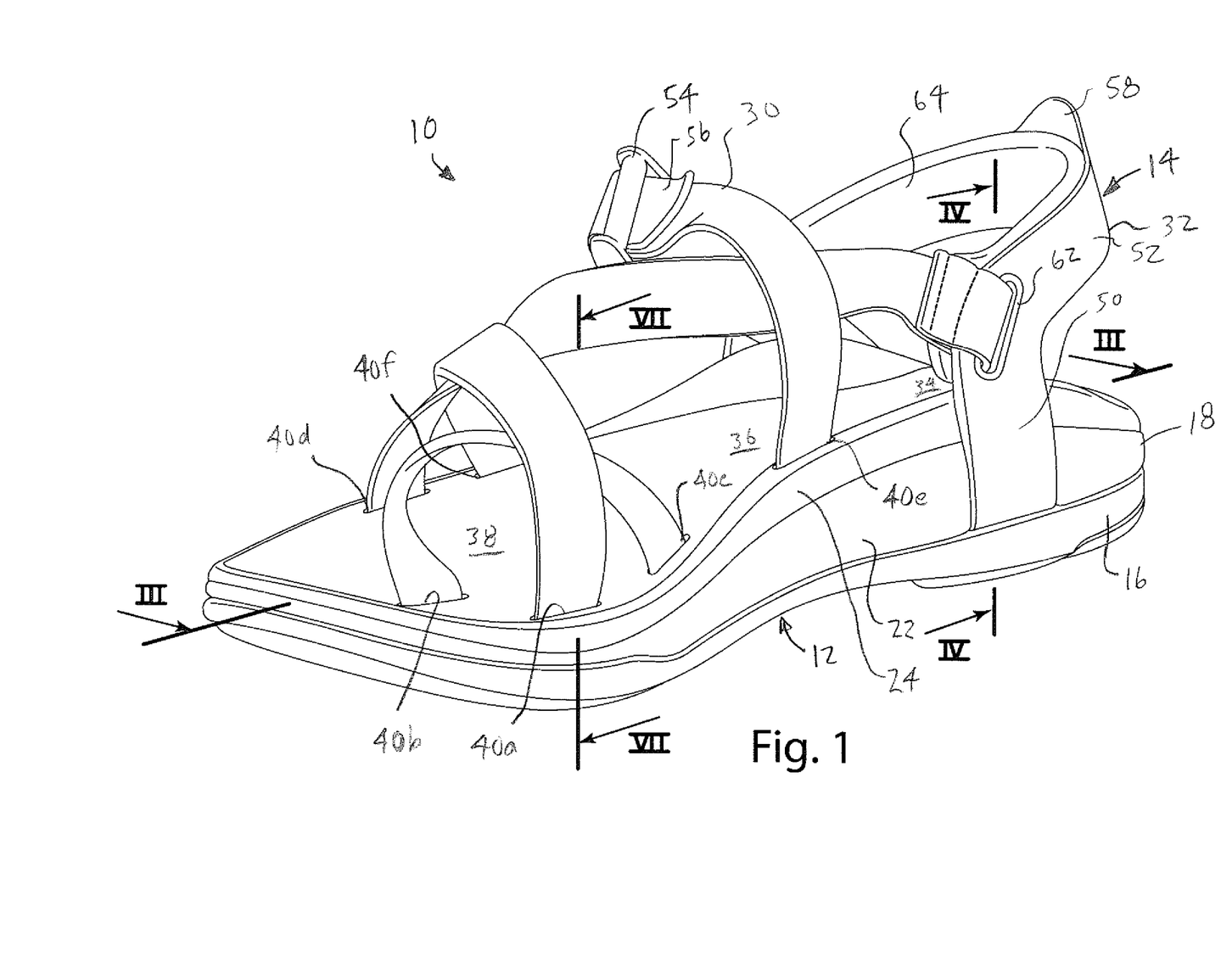
FIG. 1 is a perspective view of a sandal incorporating an embodiment of the present invention.

A sandal constructed in accordance with a preferred embodiment of the present invention is shown in FIG. 1 and generally designated 10. In general, the sandal 10 includes a sole 12 and an upper 14. The sole 12 generally includes an outsole 16, a midsole 18 and a sole plate 20 embedded within the midsole 18. The midsole 18 may be manufactured from a lower midsole portion 22 of a first cushioning material and an upper midsole portion 24 of a second cushioning material substantially softer than the first cushioning material. The sole plate 20 may have a three-dimensional shape configured to provide a heel cup 26 defining a large central opening 28. The heel cup 26 may be shaped to present a convex heel structure surrounding the heel opening 28. The upper 14 generally includes a strap 30 and a heel cradle 32 that are affixed to the sole 12. The strap 30 crosses back and forth over the forefoot and midfoot to retain a wearer's foot. The heel cradle 32 is configured to assist in maintaining close contact between the sole 12 and the heel of the wearer's foot during use. The heel cradle 32 of this embodiment is injection molded with a three-dimensional shape configured to allow the heel cradle 32 to comfortably seat and retain the heel of the wearer's foot.

The sandal 10 of FIG. 1 is merely exemplary and the various aspects of the present invention may be incorporated into a wide range of alternative sandal constructions, including sandals with alternative sole constructions and/or alternative upper constructions. The illustrated sandal 10 is intended to be worn on the right foot and will be described in detail. Of course, a sandal intended to be worn on the left foot may be a mirror image of the illustrated sandal 10. Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

A. General Construction.

Figure 2:
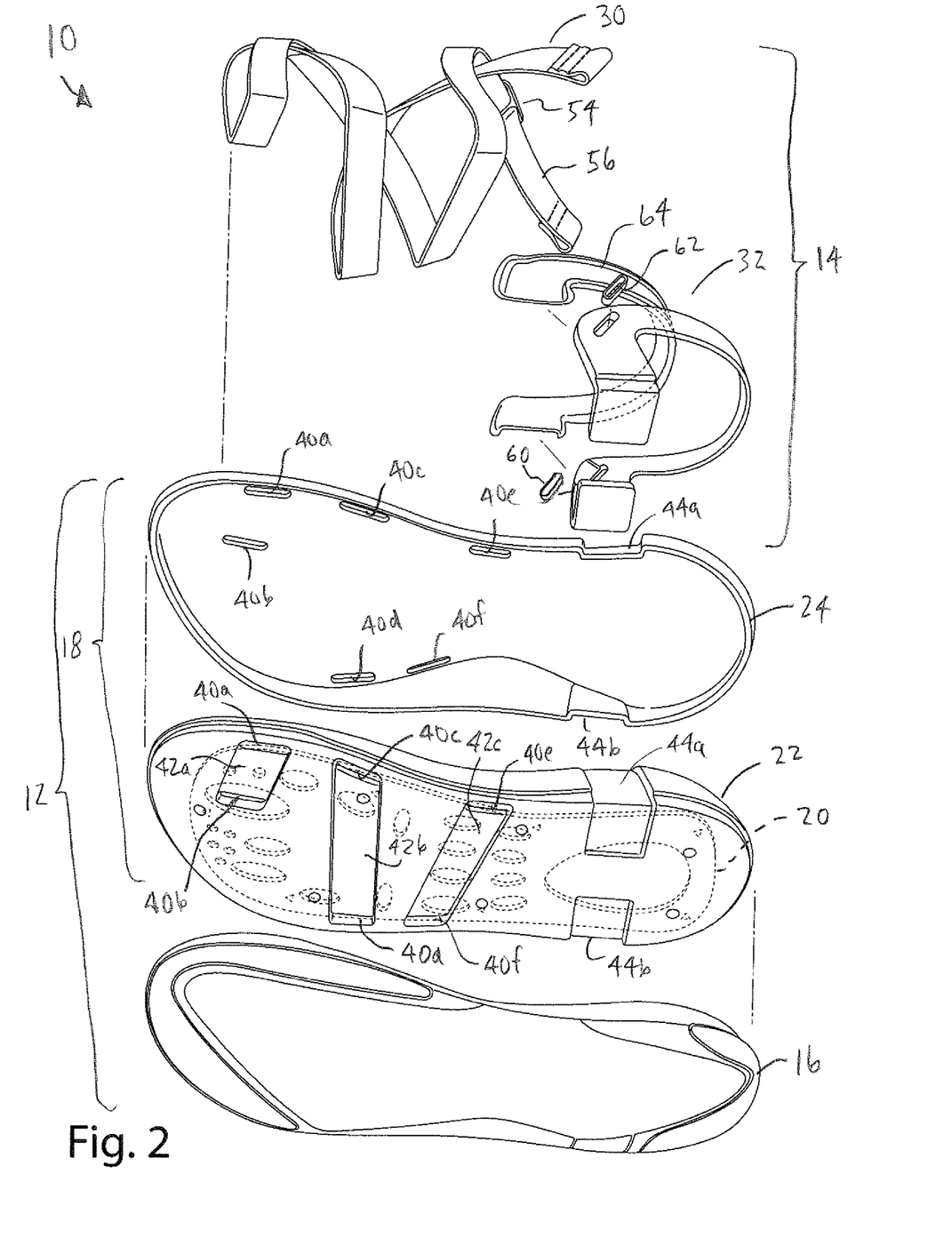
FIG. 2 is an exploded view of the sandal.

As noted above, the sandal 10 of FIG. 1 generally includes a sole 12 and an upper 14 that are interconnected. FIG. 2 is an exploded view of the sandal 12 showing various parts of the sandal 10 in separation. The sole 12 generally includes an outsole 16, a midsole 18 and a sole plate 20 embedded within the midsole 18. In this embodiment, the outsole 16 forms the ground-engaging layer of the sandal 10. The outsole 16 of FIG. 1 is generally conventional and is made of conventional outsole materials (such as rubber or a rubber compound) that are selected to provide the desired balance between comfort, wear and traction. Although the outsole 16 may be manufactured from a conventional rubber compound, a variety of other materials may be used to provide the desired comfort, wear and traction. The bottom surface of the outsole 16 may include treads, lugs or otherwise be configured to enhance traction. The design and configuration of the outsole 16 may vary from application to application as desired. For example, the outsole 16 may be formed by a plurality of separate portions that are affixed to the undersurface of the midsole 18, such as separate heel and forefoot portions that are spaced apart from one another in the arch region.

The midsole 18 of the illustrated embodiment is a dual-density midsole manufactured from a lower midsole portion 22 and an upper midsole portion 24. In this embodiment, the lower midsole portion 22 is manufactured from a first cushioning material of the desired stiffness and the upper midsole portion 24 is manufactured from a second cushioning material that is substantially softer than the first cushioning material. The upper and lower sole portions may be molded together into a one-piece dual-density sole component. In the embodiment of FIG. 1, the upper midsole portion 24 is manufactured from polyurethane ("PU") (or other similar material, such as EVA) having a hardness of about 48+/−4 Shore C and the lower sole portion 22 is manufactured from PU (or other similar material, such as EVA) having a hardness of about 68+/−4 Shore C.

In the sandal 10 of FIG. 1, the top of the midsole 18 has a three dimensional shape intended to follow the anatomical shape of a typical wearer's foot. For example, the upper surface of the midsole 18 may be configured to mirror the shape of the undersurface of a typical wearer's foot. Referring to FIG. 1, the upper surface of the midsole 18 may be generally divided into region having a heel recess 34, a central arch support 36 and a generally planar forefoot region 38. The heel recess 34 may be position to help seat the heel of the wearer's foot when the wearer's foot is properly engaged with the heel cradle 32 (as described in more detail below). In the illustrated embodiment, the upper midsole portion 24 may have generally the same thickness over the full extent of the midsole 18 and the overall contours of the midsole 18 may be defined primarily by variations in the underlying lower midsole portion 22. For example, the lower midsole portion 22 may vary in shape to define a recess in the heel region, an arch support in the arch region and a generally planar forefoot region.

Figure 8:
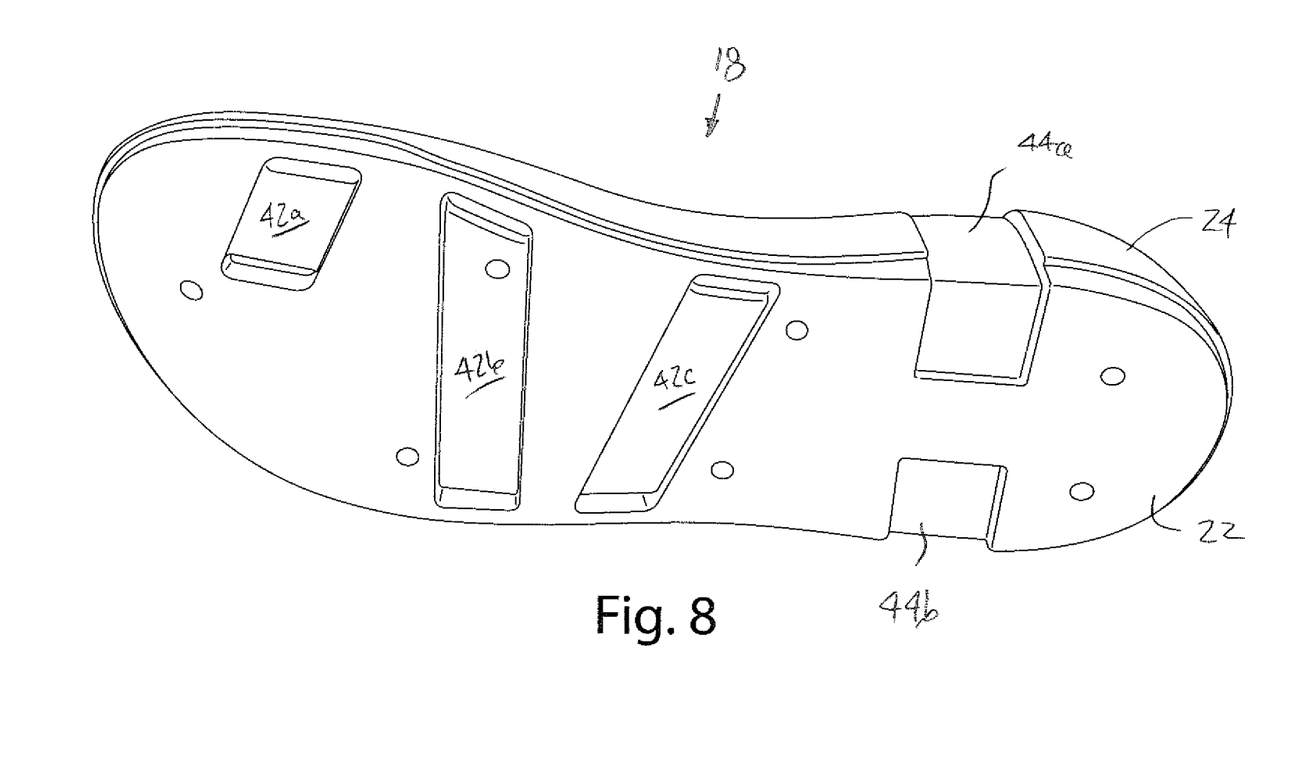
FIG. 8 is a bottom perspective view of the midsole.
Figure 9:
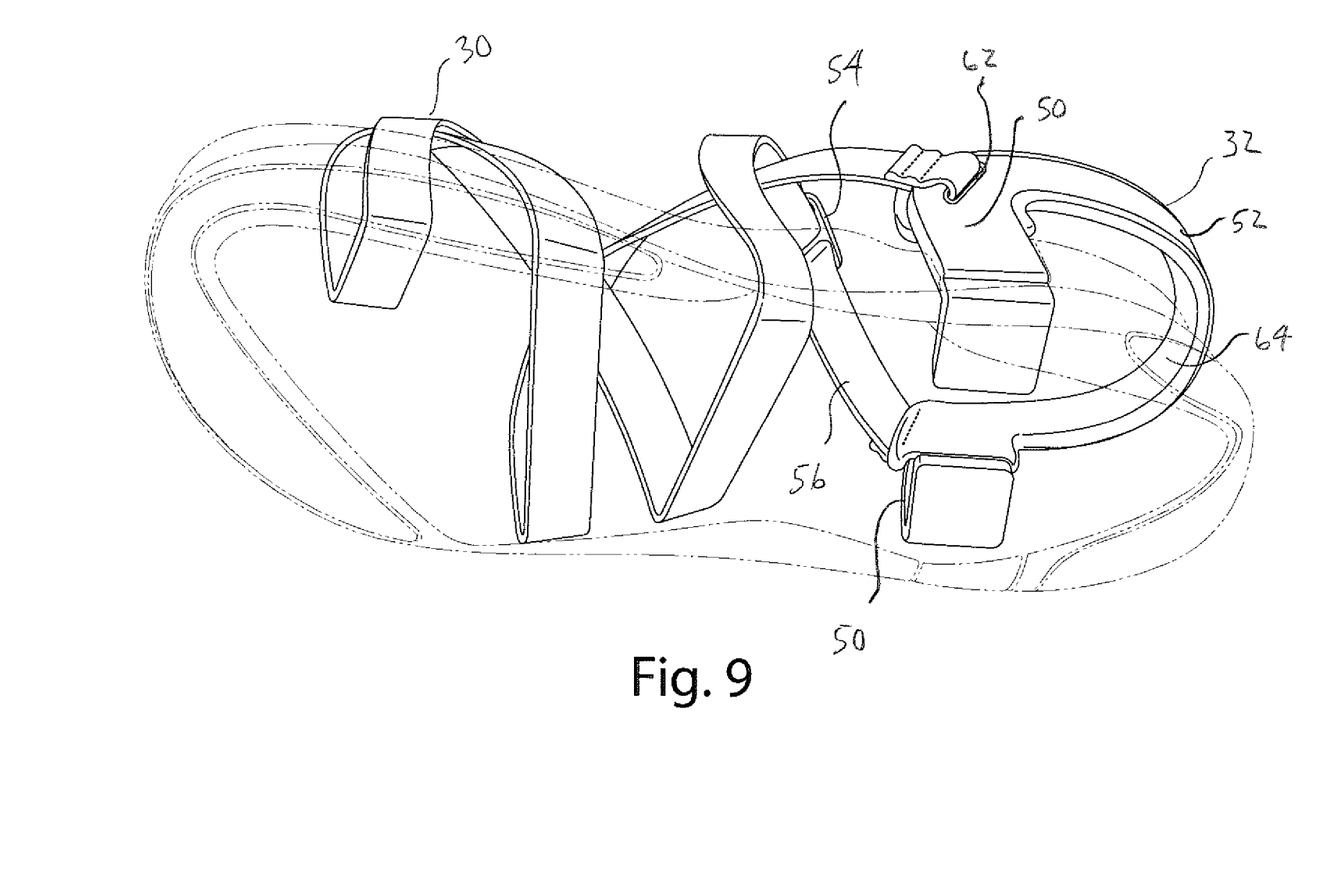
FIG. 9 is a bottom perspective view of the sandal with portions shown in broken lines to show the strap arrangement.

The midsole 18 of FIG. 1 is configured to receive the upper 14, including the strap 30 and the heel cradle 32. In this embodiment, the midsole 18 defines a plurality of through-holes 40a-f shaped to allow different regions of the strap 30 to pass through the thickness of the midsole 18. The through-holes 40a-f are defined to closely correspond in size and shape with the material used to form the strap 30. The undersurface of the midsole 18 also defines a plurality of channels 42a-c that interconnect the through-holes 40a-f and are shaped to allow different regions of the strap to extend along the undersurface of the midsole 18. For example, in this embodiment, the midsole 18 defines a toe channel 42a positioned generally beneath the big toe, a forefoot channel 42b positioned generally beneath the forefoot and a midfoot channel 42c positioned generally beneath the midfoot. In the illustrated embodiment, the through-holes 40a-f and channels 42a-c are sized to allow lengthwise movement of the straps, which in turn facilitates adjustment of the strap 30. The midsole 18 of FIG. 1 is also configured to receive the heel cradle 32. As shown in FIG. 8, the midsole 18 includes side channels 44a-b configured to seat portions of the heel cradle 32. For example, side channel 44a extends along the medial side of the midsole 18 and side channel 44b extends along the lateral side of the midsole 18. Additionally, the side channels 44a-b may extend along the undersurface of the midsole 18 to provide recesses adapted to receive end portions of the heel cradle 32 that may extend along the undersurface of the midsole 18, as shown in FIG. 9.

Figure 3:
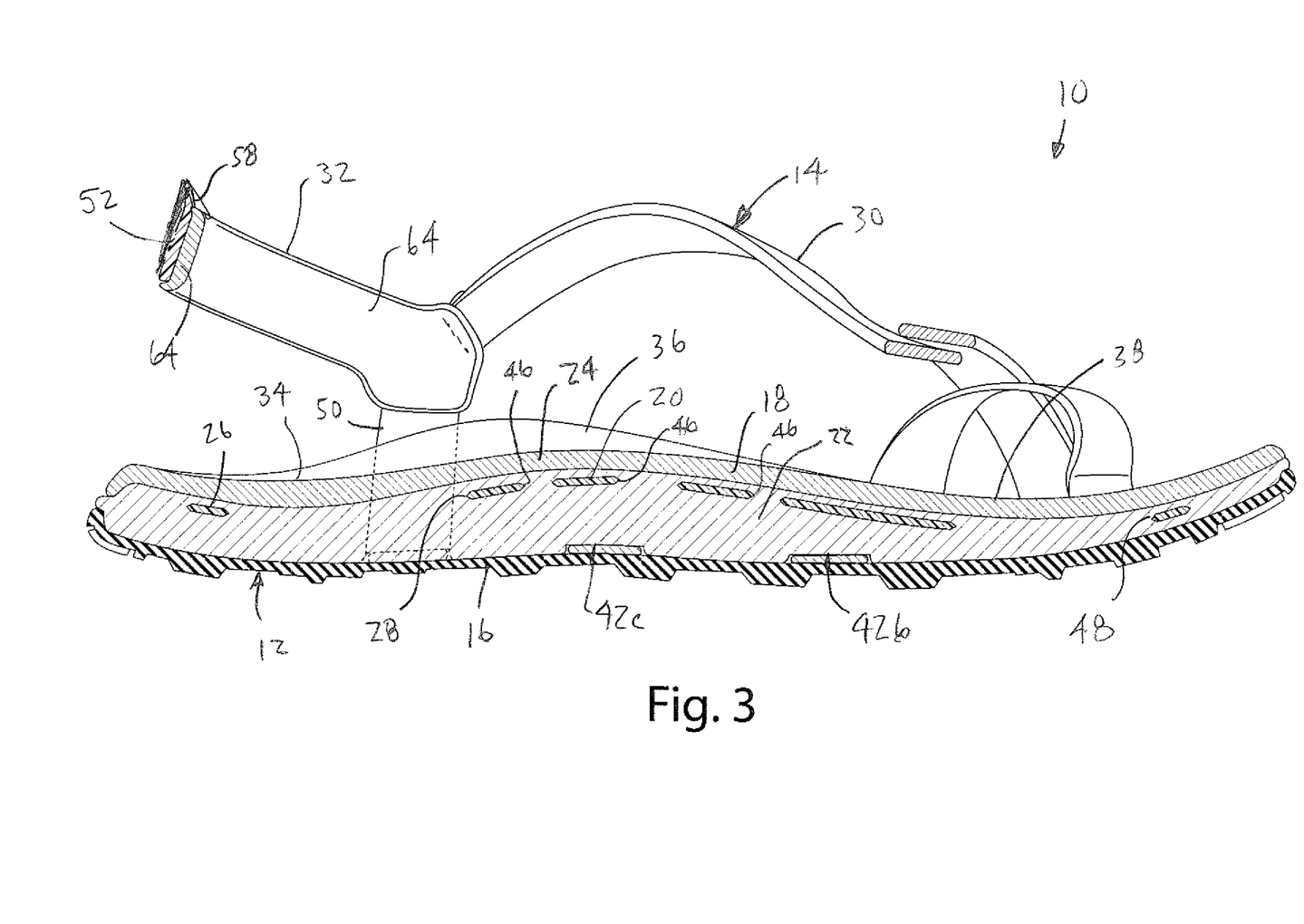
FIG. 3 is a sectional view of the sole taken along line II-II of FIG. 2.
Figure 4:
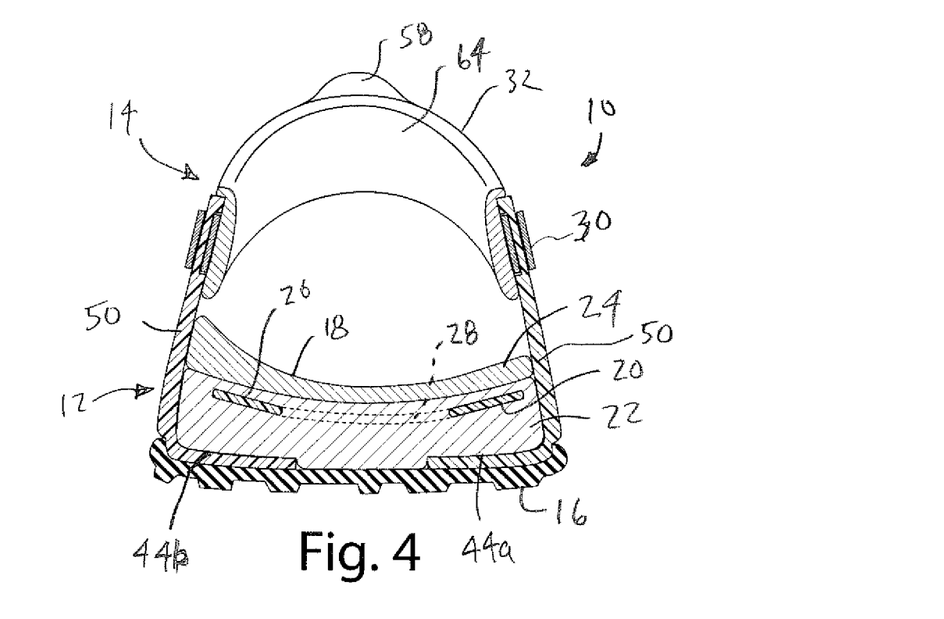
FIG. 4 is a sectional view of the sole taken along line III-III of FIG. 2.

As noted above, the sandal 10 includes a sole plate 20 intended, in part, to provide the sole 12 with supplemental stability and support, as well as enhanced energy return. The sole plate 20 is embedded within the sole, for example, using an insert molding process. The position of the sole plate 20 within the midsole 18 may vary. However, in typical embodiments, the plate 20 is embedded within the lower midsole portion 22 in the second cushioning material. As perhaps best shown in FIG. 3, the sole plate 20 of the illustrated embodiment is embedded within the second cushioning material adjacent to and generally parallel with the upper extent of the second cushioning material. The sole plate 20 may be positioned toward the top of the second cushioning material. For example, the upper surface of the sole plate 20 may extend generally parallel to and be offset approximately 2 millimeters from the upper surface of the lower midsole portion 22. The offset may vary, however, from application to application. In one embodiment, the offset may be in the range of about 0.5 millimeters to about 5 millimeters. In other embodiments, the offset may not exceed 6 millimeters, 5 millimeter, 4 millimeters, 3 millimeters or 2 millimeters. To provide the desired interaction between the sandal upper 14 and the sole 12, the sole plate 20 may be manufactured from a generally rigid material, such TPU or other similar polymeric materials, having a hardness of about 73+/−2 Shore D. In the illustrated embodiment, a sole plate in this hardness range will provide significant energy return without being too rigid to prevent good foot/sole contact as the sole flexes. The sole plate 20 may, however, have different physical properties, as desired, from application to application. For example, a stiffer sole plate may be provided for sandals intended for use on more uneven terrain, and a more flexible sole plate may be provided for sandals intended for use on more even terrain or in less aggressive sporting activities.

Figure 5:
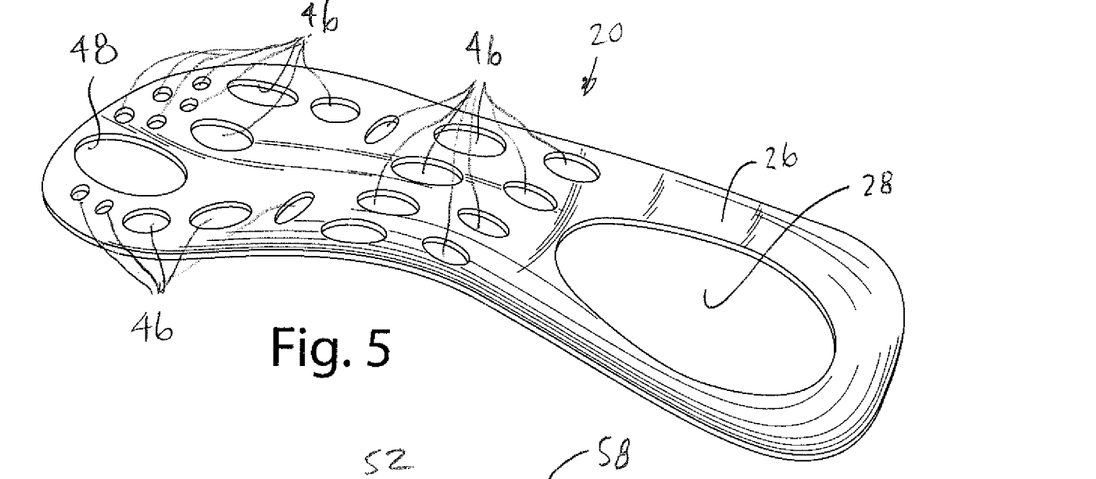
FIG. 5 is a perspective views of the sole plate.
Figure 6:
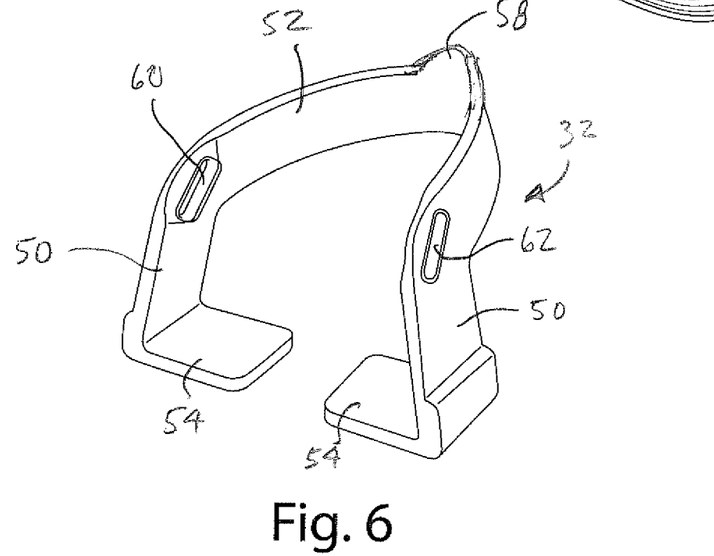
FIG. 6 is a perspective view of the heel cradle.
Figure 7:
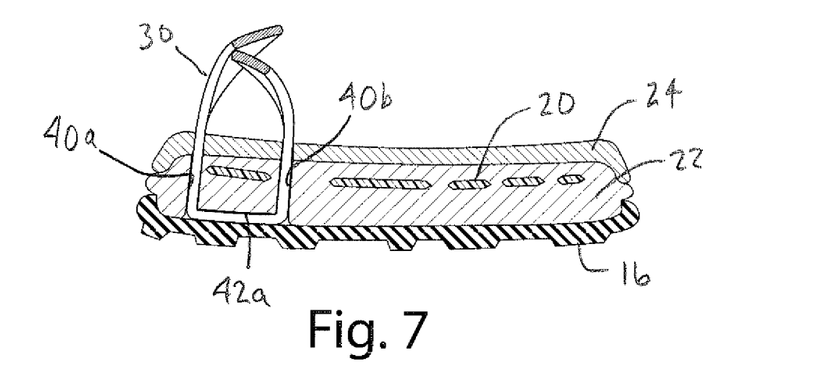
FIG. 7 is a sectional view of the sandal taken along line VII-VII of FIG. 1.

As perhaps best shown in FIG. 5, the sole plate 20 of the illustrated embodiment has a three-dimensional shape. As shown, the sole plate 20 is shaped to generally correspond with the shape of the undersurface of the wearer's foot. Referring now to FIG. 5, the sole plate 20 has a heel region configured to generally provide a heel cup 26 with a large central heel opening 28 located in approximately in the center of the heel region. The heel opening 28 allows the heel of the wearer's foot to more easily sink into the sole 12. It is therefore desirable to position the heel opening 28 in a location that will help to center the heel with respect to the sole 12 and the heel cradle 32. As shown, the sole plate 20 material surrounding the heel opening 28 has a three-dimensional concave cup-like shape that directs the heel downwardly into the heel opening 28. In use, the heel cup 26 cooperates with the heel opening 28 to help center and hold the heel of the wearer's foot. Additionally, the sole plate 20 includes an arch region shaped to transition away from the heel cup 26 extending upwardly in the arch region to assist in providing the sole 12 with appropriate arch support. The degree and extent of the arch support may vary from application to application, but it the illustrated embodiment corresponds in size and shape with the upper surface of the midsole 18 in the arch region of the sole 12. The sole plate 20 also includes a forefoot region that is shaped to generally follow the shape of the forefoot portion of the wearer's foot.

In the illustrated embodiment, the sole plate 20 defines a plurality of openings 46 configured to assist in providing the plate with controlled flexibility. The number, size, shape and location of the openings may be varied from application to application to provide customized plate characteristics. For example, an increased number of openings can be provided in areas of the plate 20 where additional flexibility is desired. The number, location, shape and arrangement of openings 46 can be used to control the performance characteristics of the sole plate 20 without the need to change material selection or to change the general dimensions of the sole plate 20.

In the illustrated embodiment, the sole plate 20 is configured to have a peripheral edge that terminates inwardly of through-holes 40a and 40c-f. This allows the strap 30 to pass through the midsole 18 without interference from the sole plate 20. However, in this embodiment, through-hole 40b is positioned within the perimeter of the sole plate 20. As a result, the sole plate 20 defines a toe strap opening 48 aligned with through-hole 40b to facilitate passage of the strap 30 through the sole plate 20. The toe strap opening 48 allows the sole plate 20 to extend under the big toe with interfering with the arrangement of the strap 30.

As noted above, the sandal 10 includes an upper 14 secured to the sole 12. In the illustrated embodiment, the upper 14 generally includes a strap 30 and a heel cradle 32.

As shown in FIG. 1, the strap 30 crosses back and forth over the forefoot and midfoot to retain a wearer's foot. Opposite free ends of the strap 30 are secured to the heel cradle 32. In this embodiment, the first free end of strap 30 is attached to the heel cradle 32 on the medial side of the sandal 10. From there, the strap 30 extends over the top of the midfoot and then down through through-hole 40d. The strap 30 continues through strap channel 42b and up through through-hole 40c. After emerging from through-hole 40c, the strap 30 extends over the top of the foot and down through through-hole 40-b along the inside of the wearer's big toe. On the bottom of the midsole 18, the strap 40 continues under the big toe through strap channel 42a and then up through through-hole 40a. After emerging from through-hole 40a, the strap 30 extends back over the top of the wearer's foot down into through-hole 40f. On the bottom of the midsole 18, the strap 30 continues from through-hole 40f to through-hole 40e along strap channel 42c. The strap 30 extends up through through-hole 40e to the top surface of the midsole 18. The strap 30 continue over the top of the foot and the second free end of the strap 30 is affixed to the heel cradle 32 on the lateral side of the sandal 10. The second free end of the strap 30 may be joined to the heel cradle 32 using a length-adjustment arrangement. For example, the strap 30 may include a buckle 54 that is joined to the heel cradle 32 by an adjustment strap 56. As shown, the adjustment strap 56 may be fed through the buckle 54 in a conventional manner in such a way as to allow the effective length of the strap 30 to be adjusted by varying the length of the portion of the adjustment strap 56 that is situated between the buckle 56 and the heel cradle 32. In this embodiment, the strap 30 is capable of movement through the through-holes 40a-f and strap channels 42a-c. This permits the various segments of the strap 30 to be adjusted relative to one another and therefore allows the strap 30 to provide a custom fit to any foot. The amount of force required to adjust the strap 30 may be varied by adjusting the fit of the strap 30, through-holes 40a-f and strap channels 42a-c. For example, a tighter fit may be used increase the resistance to movement of the strap 30 and a looser fit be provided to make movement easier. The illustrated strap arrangement is merely exemplary and the present invention may be implement in sandals having other strap arrangements.

As noted above, the heel cradle 32 is configured to join with the strap 30 and form the heel portion of the upper 14. In this embodiment, the heel cradle 32 is specially configured to assist in maintaining close contact between the sole 12 and the heel of the wearer's foot during use. The heel cradle 32 of this embodiment is injection molded with a three-dimensional shape configured to allow the heel cradle 32 to comfortably seat and retain the heel of the wearer's foot. More specifically, the heel cradle 32 is molded with a three-dimensional shape that is anatomically correct and is inwardly angled to narrow toward the top to assist in holding the heel down against the upper surface of the sole 12. The heel cradle 32 may be manufactured from TPU or other polymeric materials.

In the illustrated embodiment, the heel cradle 32 includes a pair of generally upright posts 50 that joined by a heel strap 52. The posts 50 are secured to and extend upwardly along opposite sides of the sole 12. As shown, the posts 50 extend along the side channels 44a-b. In this embodiment, the posts 50 include bottom end portions 54 that extend inwardly approximately 90 degrees. The end portions 54 are sandwiched between the midsole 18 and the outsole 16, for example, in portions of the side channels 44a-b extending along the bottom of the midsole 18 as shown in FIG. 9. The posts 50 may be cemented to the midsole 18 along the entire length of the side channels 44a-b (e.g. along the sides and bottom of the midsole 18). Additionally, the posts 50 may be cemented to the outsole 16.

The heel strap 52 wraps around the rear of wearer's foot. In the illustrated embodiment, the heel strap 52 is of approximately uniform height and thickness along its length. The heel strap 52 of the illustrated embodiment includes a central tab 58 that extends upwardly to provide a structure that may be helpful in pulling the heel strap 52 into position when putting on the sandal 10. The size, shape and configuration of the central tab 58 may vary from application to application, as desired. The central tab 58 may be eliminated in some alternative applications.

The upright posts 50 and heel strap 52 may be integral parts of a one-piece molded component. The horizontal strap may include a rear portion that is configured to engage the rear of the wearer's foot above the calcaneus. In the illustrated embodiment, the upright posts 50 extend inwardly at an angle of approximately 64 degrees from vertical so that the heel cradle 32 narrows toward the top in the medial-lateral direction. In use, this allows the heel cradle 32 to close on the narrow space above the calcaneus or heel bone to more comfortably seat and retain the heel of the wearer's foot. The angle of the upright posts 50 may be varied. For example, the angle of the upright posts may be in the range of 60-70 degrees or in the range of 55-75 degrees.

The heel cradle 32 of the illustrated embodiment includes a lateral strap insert 60 and a medial strap insert 62. The strap inserts 60, 62 are configured to receive opposite ends of the strap 30. In the embodiment of FIG. 1, the strap inserts 60, 62 are integrally molded with the heel cradle 32. For example, the strap inserts 60, 62 may be inserted into the mold cavity for the heel cradle 32 prior to molding so that the heel cradle material at partially surrounds and becomes intimately bonded with the strap inserts 60, 62. In alternative embodiments, the strap inserts 60, 62 may be secured to the heel cradle 32 after the heel cradle 32 is molded or the strap inserts 60, 62 may be eliminated. The strap inserts 60 may be manufactured from TPU, nylon or other materials of sufficient rigidity to receive and retain the strap 30.

Figure 10:
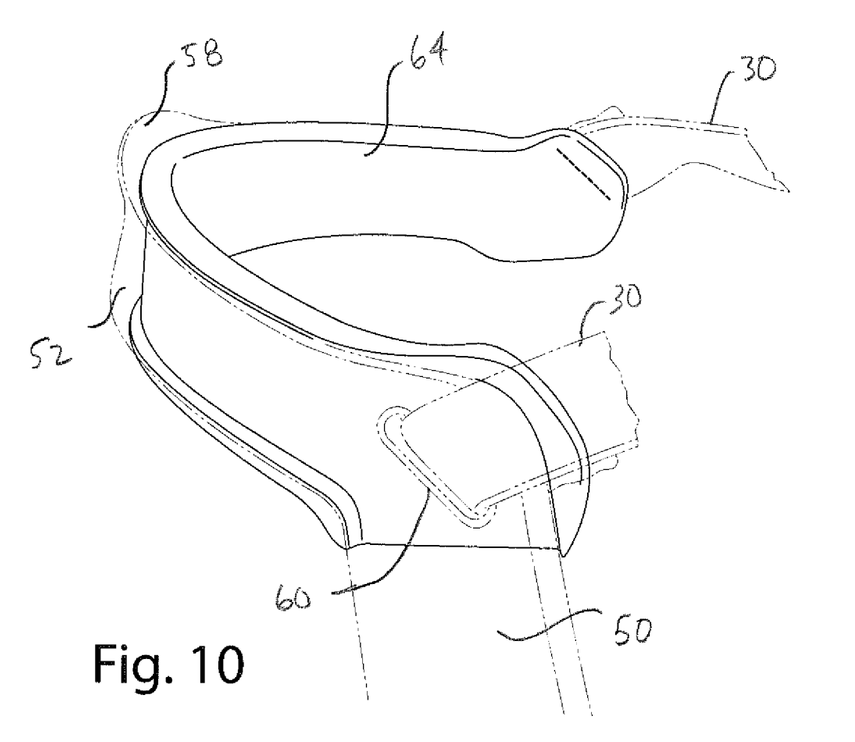
FIG. 10 is a perspective view of the heel cradle with portions shown in broken lines to show the heel pad.

The heel cradle 32 of the illustrated embodiment includes a heel pad 64. The heel pad 64 is affixed to the insider of the heel cradle 32 to provide a comfortable interface between the heel cradle 32 and the wearer's foot. The heel pad 64 may be manufactured from EVA, polyurethane or other similarly soft and durable materials. The heel pad 64 may be secured to the heel cradle 32 by cement or adhesive disposed along the engaging surfaces of the heel pad 64 and the heel cradle 32. As shown, end portions of the heel pad 64 cover the strap inserts 60, 62 to help protect the wearer's foot against abrasive contact with the strap 30 and strap inserts 60, 62. In the illustrated embodiment, the end portions of the heel pad 64 are not affixed to the heel cradle 32 or to the strap inserts 60, 62, but instead are left free so that the strap 30 can be easily fed through the strap inserts 60, 62. The heel pad 64 may also be stitched to the heel cradle 32 at opposite ends to help prevent separation of the heel pad 64. For example, the heel pad 64 may be stitched to the upright posts 50 of the heel cradle 32 at a location adjacent to the free end portions of the heel pad 64.

Figure 11:
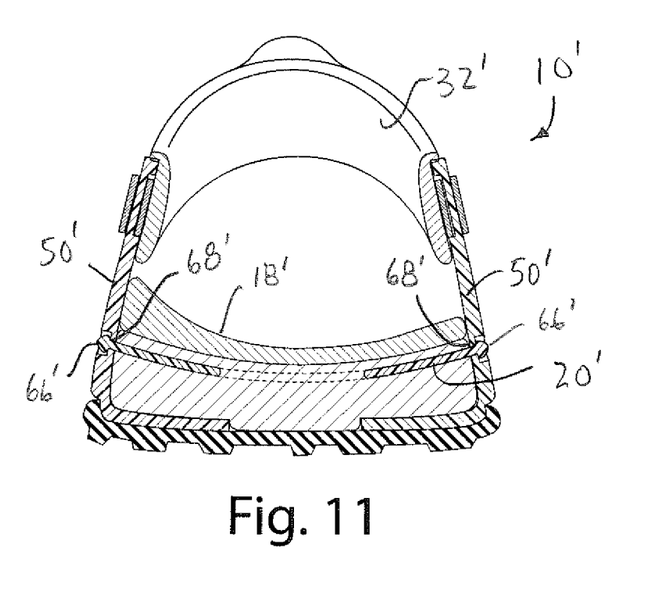
FIG. 11 is a sectional view of an alternative sandal showing an interconnection between the heel cradle and the sole plate.
Figure 12:
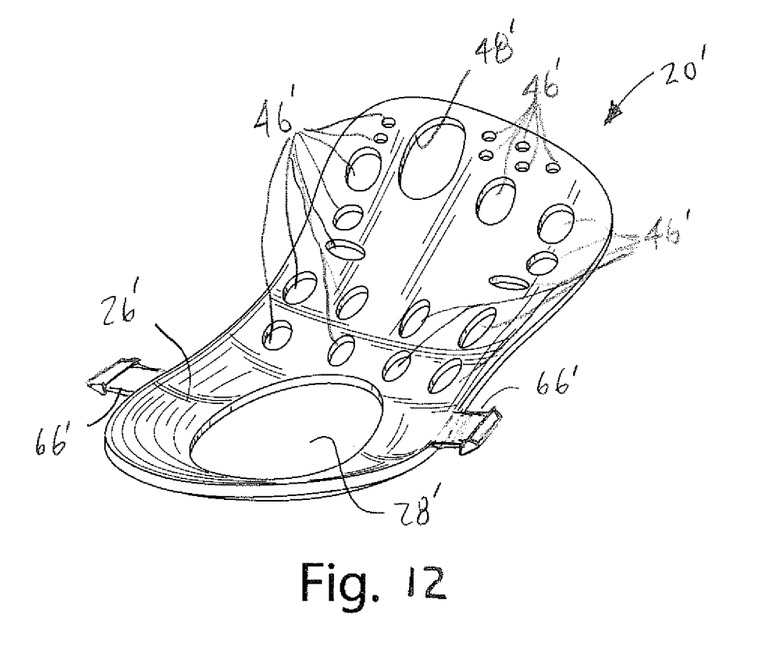
FIG. 12 is a perspective view of the sole plate of the alternative embodiment.
Figure 13:
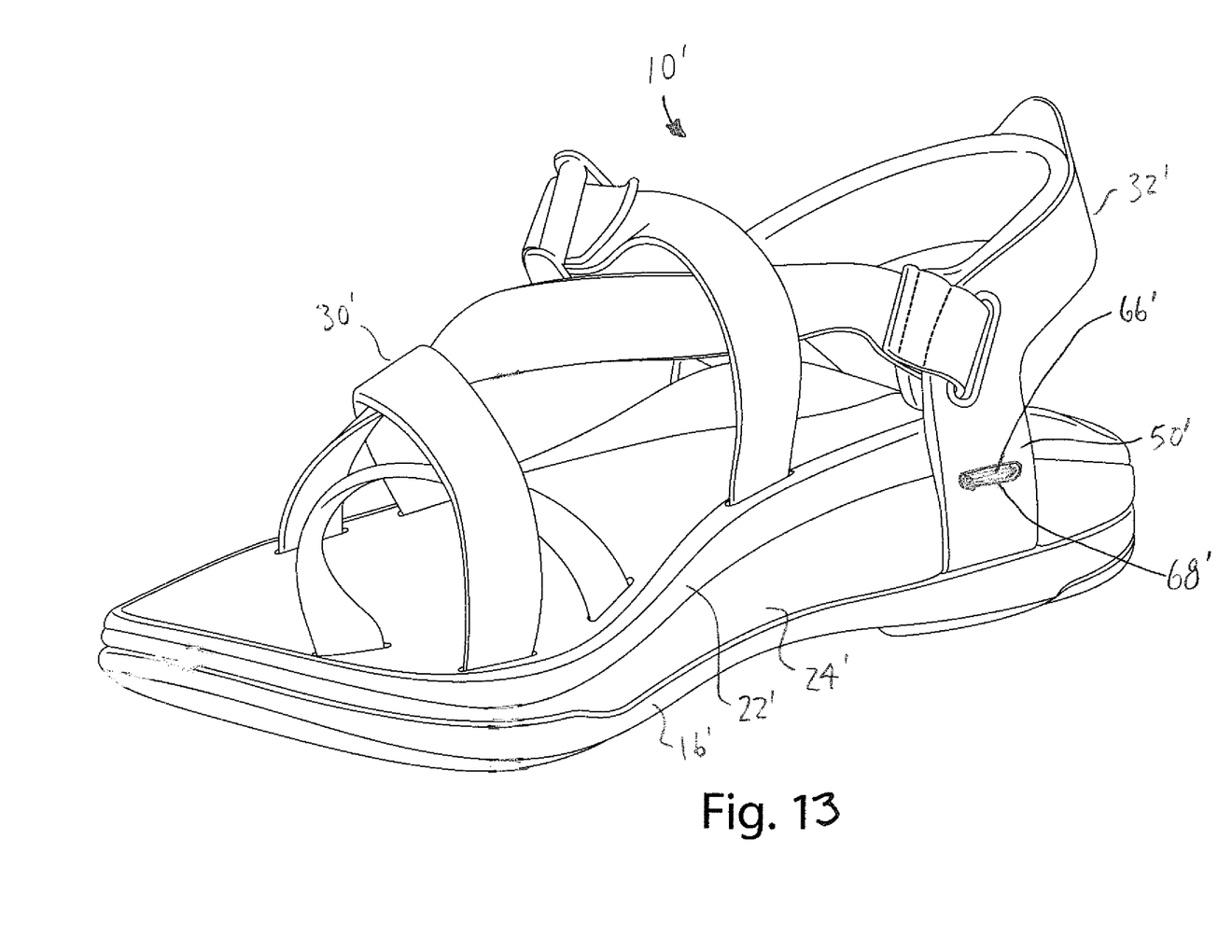
FIG. 13 is a perspective view of the alternative sandal.

In an alternative embodiment, the sandal 10' may include a sole plate 20' that is configured to interlock with the upright posts 50' of the heel cradle 32'. For example, as shown in FIGS. 11-13, the sole plate 20' may extend to the peripheral edge of the midsole 18' and may include interlocking features 66' intended to interlock with corresponding interlocking features 68' on the upright posts 50'. As shown, the interlocking features 66', 68' may include a barbed spine and receptacle arrangement in which the spine and receptacle are configured to snap-lock into engagement with one another. For example, the barbed spines 66' may be forced through corresponding openings 68' in the posts 50'. Each of the spines 66' may have tapered head that facilitate insertion of the spine 66' into the opening 68', and a flat inner surface that resists removal of the tapered head from the opening 68'. Other mechanical arrangements may be used as an alternative to interlock or interconnect the upright posts 50' and the sole plate 20'. In some application, the interlocking features may be supplemented or replaced by cement, adhesives or other attachment methods.

B. Manufacture.

A sandal in accordance with the present invention may be manufactured using a wide variety of manufacturing methods and equipment. For purposes of disclosure, one method for manufacturing the sandal 10 of FIG. 1 will be described generally, but alternative manufacturing methods and equipment may be used.

The sandal 10 is manufactured using generally conventional machinery. The outsole 16 is manufactured by using conventional techniques and apparatuses. The outsole 16 may be manufactured as a single unitary sole component, or it may include separate parts that cooperate to form the outsole 16. For example, the outsole 16 may include parts of different hardness, different color or other different characteristics. The outsole 16 of the illustrated embodiment is injection or pour molded from a hard durable rubber using conventional molding apparatuses. The outsole 16 can be manufactured from other durable outsole materials. The tread pattern is formed during the molding operation as an integral part of the outsole 16.

The sole plate 20 of the illustrated embodiment is injection molded from TPU or other similar materials. In some applications, the sole plate 20 may be manufactured from nylon. If desired, the sole plate 20 may be reinforced by other materials, such as fiberglass.

The dual-density midsole 18 of FIG. 1 is manufactured in two molding processes. In the first molding process, the lower midsole layer 22 is formed with the embedded sole plate 20. In the second molding process, the upper midsole layer 22 is formed. The lower midsole layer 22 is manufactured using a generally conventional dual-density mold having a base mold and a pair of alternative cover molds (not shown). In this embodiment, the sole plate 20 is embedded within the lower midsole layer 22. To manufacture the lower midsole layer 22, the sole plate 20 is positioned in the base mold (not shown). In this embodiment, the sole plate 20 is seated on locating pins that hold the sole plate 20 in the desired position. In alternative applications, the lower midsole portion 22 may be manufactured without the sole plate 20, and the sole plate 20 may be later cemented or otherwise bonded to the undersurface of the upper midsole portion 24 or the upper surface of the lower midsole portion 22. The base mold may include features intended to define the through-holes 40*a*-*f*, the strap channels 42*a*-*c* and the side channels 44*a*-*b* in the lower midsole portion 22.

Following molding of the lower midsole portion 22, the first cover mold is removed from the base mold and the second cover mold is positioned on the base mold while the lower midsole portion 22/sole plate 20 combination remains in the mold cavity. The second cover mold defines the mold cavity for the upper midsole portion 24 immediately adjacent the upper surface of the lower midsole portion 22 so that the upper midsole portion 24 is molded directly onto the lower midsole portion 22. The second cover mold includes features intended to define the through-holes 40*a*-*f*, the strap channels 42*a*-*c* and the side channels 44*a*-*b* in the upper midsole portion 24.

The heel cradle 32 is manufactured using conventional injection molding methods and equipment. The strap inserts 60 are molded in place within the heel cradle 32. The strap inserts 60 are situated in the mold cavity prior to injection of the desired material. In this embodiment, the heel cradle 32 is cemented to the sole 12. The upright posts 50 are cemented into the side channels 44*a*-*b* along the sides and bottom of the midsole 18. Cement may extend along the full length of the side channels 44*a*-*b*.

In the illustrated embodiment, the heel pad 64 is molded and affixed to the heel cradle 32 after molding. The central portion of the heel pad 64 is cemented to the heel strap of the heel cradle 32. In this embodiment, opposite ends of the heel pad 64 overlie the strap inserts 60 and are unconnected to the heel cradle 32. In desired, the heel pad 64 may also be stitched to the heel cradle 32 on both ends with the stitching extending approximately in alignment with the ends of the cemented central portion 64 of the heel pad 64. The heel pad 64 may be secured to the heel cradle 32 before or after the heel cradle 32 is affixed to the midsole 18.

The strap 30 of the illustrated embodiment is generally conventional and will not be described is extensive detail. Suffice it to say that the strap is manufactured from a conventional nylon webbing or other similar materials. In this embodiment, the strap 30 is threaded through the midsole 18 (as discussed above) before the outsole 16 is attached to undersurface of the midsole 18. One end of the strap 30 is affixed to the medial side of the heel cradle 32. The strap 30 is fed through the medial strap insert 60 folded back onto itself and then stitched together to hold it in place. The opposite end of the strap 30 is secured to the lateral side of the heel cradle 32 by an adjustable strap 56 so that the effective overall length of the strap 30 can be adjusted. The adjustable strap 56 is fed through the lateral strap insert 60, folded back onto itself and then stitched, thereby leaving a length of free strap that is threaded through the buckle 54 affixed to the end of the strap 30.

To complete the construction, the outsole 16 is attached to the bottom of the midsole 18, for example, by cement or other adhesive. The cement or other adhesive may be applied over the entirety of the undersurface of the midsole 18 and the end portions of the upright posts 50 extending along the undersurface of the midsole 18.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A sandal comprising:
a sole having a dual-density midsole with an upper layer of a first density and a lower layer of a second density greater than the first density;
a sole plate embedded in the midsole, the sole plate disposed in the lower layer;
a heel cradle attached to the sole in a heel region, the heel cradle having a lateral upright and a medial upright integrally formed with a heel strap, the heel cradle being molded with an anatomical three-dimensional shape with the uprights angled inwardly toward one another such that the heel cradle narrows toward an upper extent; and
a strap affixed to the sole, the strap crossing over a midfoot and forefoot regions of the sole, the strap having a pair of opposed free ends, a first of the free ends being affixed to the heel cradle on the lateral side of the sole and a second of the free ends being affixed to the heel cradle on the medial side of the sole.

2. The sandal of claim 1 wherein the sole plate has a three-dimensional shape generally corresponding with a shape of the bottom surface of a foot.

3. The sandal of claim 2 wherein the sole plate defines a heel opening in a heel region.

4. The sandal of claim 3 wherein the sole plate includes a general concave heel cup in the heel region, the heel opening defined by the heel cup.

5. The sandal of claim 4 wherein the sole plate defines a plurality of control openings, at least one of the number, size and arrangement of the control openings selected to control at least one physical property of the sole plate.

6. The sandal of claim 5 wherein the sole plate includes at least one strap opening.

7. The sandal of claim 6 wherein the midsole defines a lateral channel and a medial channel, the lateral upright extending through and secured to the lateral channel, the medial upright extending through and secure to the medial channel.

8. The sandal of claim 7 wherein the lateral upright includes an end portion disposed between the midsole and the outsole and the medial upright includes an end portion disposed between the midsole and the outsole.

9. The sandal of claim 8 wherein the midsole includes a bottom surface defining at least one strap channel through with the strap extends from the medial side to the lateral side of the sole.

10. The sandal of claim 9 further including a heel pad extending along an interior of the heel strap.

11. The sandal of claim 10 wherein the upper layer has a hardness of about 48+/−4 Shore C and the lower layer has a hardness of about 68+/−4 Shore C.

12. The sandal of claim 11 wherein the heel cradle includes a first strap insert to which the first free end of the strap is affixed and a second strap insert to which the second free end of the strap is affixed.

13. The sandal of claim 12 wherein the midsole includes a contoured upper surface, the lower layer having an upper surface extending generally parallel to the upper surface of the midsole, the sole plate extending generally parallel to the upper surface of the midsole and the upper surface of the lower layer.

14. The sandal of claim 13 wherein the sole plate is offset from the upper surface of the lower layer a distance not greater than 4 millimeters.

15. A sandal comprising:
a sole having a dual-density midsole with an upper layer of a first density and a lower layer of a second density greater than the first density, the upper layer having an upper surface with a three dimensional shape configured to correspond with a shape of an undersurface of foot, the upper surface having a heel recess in a heel region, an arch support in an arch region and a gradual upward curve in a forefoot region, the lower layer having an upper surface extending generally parallel to the upper surface of the upper layer;
a sole plate embedded in the midsole, the sole plate disposed in the lower layer offset from the upper surface of the lower layer, the sole plate extending generally parallel to the upper surface of the upper layer and the upper surface of the lower layer, the sole plate having a heel cup defining a central opening in a heel region and an arch support in an arch region;
a heel cradle attached to the sole in a heel region, the heel cradle having a lateral upright and a medial upright integrally formed with a heel strap, the heel cradle being molded with an anatomical three-dimensional shape with the uprights angled inwardly toward one another such that the heel cradle narrows toward an upper extent;
a heel pad extending along an interior of the heel cradle; and
a strap affixed to the sole, the strap crossing over the midfoot and forefoot regions of the sole, the strap having a pair of opposed free ends, a first of the free ends being affixed to the heel cradle on the lateral side of the sole and a second of the free ends being affixed to the heel cradle on the medial side of the sole.

16. The sandal of claim 15 wherein the upper layer has a hardness in the range of about 48+/−4 Shore C and the lower layer has a hardness of about 68+/−4 Shore C.

17. The sandal of claim 16 wherein the sole plate has a hardness in the range of about 73+/−2 Shore D.

18. The sandal of claim 17 wherein each of the uprights includes an upper end portion extending inwardly at an angle in the range of between about 60 degrees to 70 degrees.

19. The sandal of claim 18 wherein the heel cradle includes strap inserts, the strap inserts integrally molded with the heel cradle, the strap adjustable affixed to the strap inserts.

20. The sandal of claim 19 wherein the heel pad includes a central portion cemented to the heel cradle and a pair of opposed end portions not directly secured to the heel cradle, the heel pad end portions overlapping the strap inserts.

* * * * *

UNITED STATES PATENT AND TRADEMARK OFFICE
CERTIFICATE OF CORRECTION

| | | |
|---|---|---|
| PATENT NO. | : 10,609,982 B2 | Page 1 of 1 |
| APPLICATION NO. | : 15/981113 | |
| DATED | : April 7, 2020 | |
| INVENTOR(S) | : Omar Velazquez et al. | |

It is certified that error appears in the above-identified patent and that said Letters Patent is hereby corrected as shown below:

In the Claims

Column 11, Claim 9, Line 55:
"with" should be --which--

Signed and Sealed this
Twenty-eighth Day of July, 2020

Andrei Iancu
*Director of the United States Patent and Trademark Office*